US012155977B2

(12) United States Patent
Davies et al.

(10) Patent No.: US 12,155,977 B2
(45) Date of Patent: Nov. 26, 2024

(54) RENDERING WIDE COLOR GAMUT, TWO-DIMENSIONAL (2D) IMAGES ON THREE-DIMENSIONAL (3D) CAPABLE DISPLAYS

(71) Applicant: Dolby Laboratories Licensing Corporation, San Francisco, CA (US)

(72) Inventors: Trevor Davies, Walnut Creek, CA (US); Martin J. Richards, Gig Harbor, WA (US); Ashley Penna, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 11 days.

(21) Appl. No.: 17/713,434

(22) Filed: Apr. 5, 2022

(65) Prior Publication Data
US 2022/0239874 A1    Jul. 28, 2022

Related U.S. Application Data

(63) Continuation of application No. 17/064,578, filed on Oct. 6, 2020, now Pat. No. 11,303,861, which is a
(Continued)

(51) Int. Cl.
*H04N 9/31*       (2006.01)
*G09G 3/34*       (2006.01)
*G09G 5/02*       (2006.01)

(52) U.S. Cl.
CPC ......... *H04N 9/3182* (2013.01); *G09G 3/3413* (2013.01); *G09G 5/02* (2013.01);
(Continued)

(58) Field of Classification Search
CPC ...... H04N 9/3182; H04N 9/3161; H04N 9/31; G09G 3/3413; G09G 5/02;
(Continued)

(56) References Cited

U.S. PATENT DOCUMENTS

| 6,885,380 B1 | 4/2005 | Primerano |
| 7,403,205 B2 | 7/2008 | Zeng |

(Continued)

FOREIGN PATENT DOCUMENTS

| CN | 103048782 | 4/2013 |
| CN | 103430555 | 12/2013 |

(Continued)

OTHER PUBLICATIONS

Stanley et al., 3D electronic holography display system using a 100 Mega-pixel spatial light modulator, 2003 (Year: 2003).*

(Continued)

*Primary Examiner* — Phong X Nguyen

(57) ABSTRACT

A display for displaying image data includes defining virtual color gamuts based on a plurality of primary display colors associated with a light source. At least one of the virtual color gamuts is defined to approximate an established color gamut. Intensity values associated with the virtual color gamuts are generated based on received video data, and the intensity values associated with the virtual color gamuts are used to generate drive values for the primary colors of the light source. A display using one or more virtual color gamuts is also disclosed.

20 Claims, 7 Drawing Sheets

Related U.S. Application Data continuation of application No. 16/312,256, filed as application No. PCT/US2017/038829 on Jun. 22, 2017, now Pat. No. 10,798,352.

(60) Provisional application No. 62/353,325, filed on Jun. 22, 2016, provisional application No. 62/402,296, filed on Sep. 30, 2016.

(52) U.S. Cl.
CPC ... *H04N 9/3161* (2013.01); *G09G 2320/0666* (2013.01); *G09G 2340/06* (2013.01)

(58) Field of Classification Search
CPC ....... G09G 2320/0666; G09G 2340/06; G09G 2320/0271; G09G 3/003
See application file for complete search history.

(56) References Cited

U.S. PATENT DOCUMENTS

| | | | |
|---|---|---|---|
| 8,098,400 | B2 | 1/2012 | Tin |
| 8,177,367 | B2 | 5/2012 | Ellinger |
| 8,390,643 | B2 | 3/2013 | Belik |
| 8,477,366 | B2 | 7/2013 | Bang |
| 8,599,226 | B2 | 12/2013 | Ben-Chorin |
| 8,610,762 | B2 | 12/2013 | Sharp |
| 8,711,168 | B2 | 4/2014 | Richards |
| 9,147,362 | B2 | 9/2015 | Znamenskiy |
| 9,224,363 | B2 | 12/2015 | Ballestad |
| 9,230,494 | B2 | 1/2016 | Hasegawa |
| 9,245,471 | B2 | 1/2016 | Tomizawa |
| 9,324,250 | B2 | 4/2016 | Basler |
| 9,837,045 | B2 | 12/2017 | Furihata |
| 9,860,504 | B2 | 1/2018 | Liu |
| 9,911,373 | B2 | 3/2018 | Nakagoshi |
| 9,997,133 | B2 | 6/2018 | Kim |
| 10,270,942 | B2 | 4/2019 | Mazzante |
| 11,727,895 | B2 * | 8/2023 | Fazzini ............... H04N 9/67 345/590 |
| 2004/0218269 | A1 | 11/2004 | Divelbiss |
| 2005/0031199 | A1 * | 2/2005 | Ben-Chorin ......... H04N 9/67 345/589 |
| 2006/0285217 | A1 | 12/2006 | Roth |
| 2007/0070363 | A1 | 3/2007 | Zeng |
| 2007/0103646 | A1 | 5/2007 | Young |
| 2007/0247402 | A1 | 10/2007 | Delacour |
| 2008/0150864 | A1 * | 6/2008 | Bergquist ............ G09G 3/2011 345/55 |
| 2008/0192151 | A1 | 8/2008 | Ramanath |
| 2009/0052774 | A1 * | 2/2009 | Yoshii ................ G06T 5/40 382/167 |
| 2009/0091582 | A1 * | 4/2009 | Ajito ................... G03B 21/005 345/589 |
| 2009/0273614 | A1 * | 11/2009 | Higgins .............. G09G 5/02 345/690 |
| 2009/0278862 | A1 | 11/2009 | Shimodaira |
| 2009/0278867 | A1 | 11/2009 | Brown Elliott |
| 2010/0091050 | A1 * | 4/2010 | El-Ghoroury ....... H04N 9/3164 345/83 |
| 2011/0157212 | A1 | 6/2011 | Zhang |
| 2011/0285962 | A1 | 11/2011 | Ellinger |
| 2012/0127194 | A1 | 5/2012 | Richards |
| 2012/0162239 | A1 | 6/2012 | Marcu |
| 2012/0287146 | A1 * | 11/2012 | Brown Elliott ...... G09G 3/3426 345/590 |
| 2012/0299907 | A1 | 11/2012 | Kim |
| 2012/0320078 | A1 | 12/2012 | Russell |
| 2013/0033491 | A1 | 2/2013 | Atkins |
| 2013/0063573 | A1 | 3/2013 | Erinjippurath |
| 2013/0222414 | A1 | 8/2013 | Ito |
| 2014/0043371 | A1 | 2/2014 | Langendijk et al. |
| 2014/0126004 | A1 * | 5/2014 | Miyahara ............ H04N 1/6061 358/1.9 |
| 2014/0132778 | A1 | 5/2014 | Holub |
| 2014/0176595 | A1 * | 6/2014 | Takahashi ............ G09G 5/02 345/590 |
| 2014/0210802 | A1 | 7/2014 | Myers |
| 2014/0292834 | A1 | 10/2014 | Ando |
| 2014/0333660 | A1 | 11/2014 | Ballestad |
| 2014/0340434 | A1 * | 11/2014 | El-Ghoroury ........ G09G 3/3413 345/88 |
| 2015/0178981 | A1 | 6/2015 | Kozak |
| 2015/0213626 | A1 | 7/2015 | Hekstra |
| 2016/0217734 | A1 * | 7/2016 | Chaji ................ G09G 3/3225 |
| 2016/0322024 | A1 * | 11/2016 | Stauder ................ G09G 5/06 |
| 2016/0372021 | A1 * | 12/2016 | Wang ................ G09G 5/10 |
| 2017/0353628 | A1 * | 12/2017 | Kishigami ........... H04N 1/6077 |
| 2022/0239874 | A1 * | 7/2022 | Davies ................ H04N 9/3161 |
| 2023/0078910 | A1 * | 3/2023 | Davies ................ H04N 9/3182 345/589 |

FOREIGN PATENT DOCUMENTS

| | | |
|---|---|---|
| CN | 104811676 B | 4/2017 |
| EP | 1407445 B1 | 7/2010 |
| JP | 2003348501 A | 12/2003 |
| JP | 2005227586 A | 8/2005 |
| JP | 2005523465 A | 8/2005 |
| JP | 4346580 B2 | 10/2009 |
| JP | 2012047827 A | 3/2012 |
| JP | 2013182149 A | 9/2013 |
| JP | 2014514598 | 6/2014 |
| JP | 2015122616 A | 7/2015 |
| JP | 2015210331 A | 11/2015 |
| RU | 2024214 | 11/1994 |
| RU | 2442291 | 2/2012 |
| WO | 2010067581 A1 | 6/2010 |
| WO | 2012140551 | 10/2012 |
| WO | 2011102260 | 6/2013 |
| WO | 2014145003 A1 | 9/2014 |
| WO | 2015048911 A1 | 4/2015 |

OTHER PUBLICATIONS

Ajito et al. (Expanded color gamut reproduced by six-primary projection display, 2000) (Year: 2000).*

Majumder et al. (Display Gamut Reshaping for Color Emulation and Balancing, 2010) (Year: 2010).*

Kwon et al. (Wide color gamut and high dynamic range displays using RGBW LCDs, 2015) (Year: 2015).*

Frohlich, J. et al "Gamut Mapping for Digital Cinema" SMPTE Meeting Presentation, Oct. 31, 2013, pp. 1-11.

Frolich, J. et al., "The SMPTE Meeting Presentation Gamut Mapping for Digital Cinema Written for presentation at the", Oct. 31, 2013, XP055406263, Retrieved from the internet: URL:http://ieeexplore.ieee.org/ielx7/7269393/7269394/07269395.pdf {retrieved on Sep. 13, 2017}, p. 3 to p. 5.

Hirai, K., "Multi-primary image projector using programmable spectral light source", 2016, Located via Engineering Village, Journal of the Society for Information Display, Feb. 2016.

Huang, J., "Six-color solid state illuminator for cinema projector", Located via Engineering Village, Aug. 18, 2014 to Aug. 20, 2014, Proceedings of SPIE—The International Society for Optical Engineering, v 9192, 2014; ISSN: 0277786X, E-ISSN: 1996756X; ISBN-13: 9781628412192; DOI: 10.1117/12.2060060; Article No. 91920W; Conference: Current Developments in Lens Design and Optical Engineering XV, Aug. 18, 2014 to Aug. 20, 2014; Sponsor: The Society of Photo-Optical Instrumentation Engineers (SPIE); Publisher: SPIE.

Kauvar, I. "Adaptive color display via perceptually-driven factored spectral projection", Nov. 15, Located via Google Scholar, Journal ACM Transactions on Graphics (TOG)—Proceedings of ACM SIGGRAPH Asia 2015 TOG Homepage, vol. 34, Issue 6, Oct. 26, 2015, pp. 1-10.

(56) References Cited

OTHER PUBLICATIONS

Roth, S. et al "10.2: Wide Gamut, High Brightness Multiple Primaries Single Panel Projection Displays" SID Symptoms Digest of Technical Papers, May 1, 2003, pp. 118-121.

* cited by examiner

RENDERING WIDE COLOR GAMUT, TWO-DIMENSIONAL (2D) IMAGES ON THREE-DIMENSIONAL (3D) CAPABLE DISPLAYS

CROSS-REFERENCE TO RELATED APPLICATIONS

The present application is a continuation of U.S. patent application Ser. No. 17/064,578, filed Oct. 6, 2020, which is a continuation of U.S. patent application Ser. No. 16/312,256, filed Dec. 20, 2018, now U.S. Pat. No. 10,798,352, issued Oct. 6, 2020, which is the United States national stage of International Patent Application No. PCT/US2017/038829, filed Jun. 22, 2017, which claims priority to U.S. Provisional Patent Application No. 62/353,325, filed Jun. 22, 2016, and U.S. Provisional Patent Application No. 62/402,296, filed Sep. 30, 2016, all of which are incorporated herein by reference in their entirety.

BACKGROUND

Technical Field

This invention relates generally to devices and displays for displaying image data, and more particularly to the display of 2D images on 3D capable displays.

Description of the Background Art

Displays exist that are capable of displaying three-dimensional (3D) images. For example, such displays display a left eye image and a right eye image, which, when viewed together, give the appearance of a 3D image. The left eye image can be produced using 3 primary-color light sources (e.g., red1, green1, and blue1), and the right eye image can be produced using 3 different primary-color light sources (e.g., red2, green2, and blue2), each having a slightly different wavelength than their counterpart of similar color. The viewer views the displayed images through eyewear that includes a left lens and a different right lens. The left lens passes the left eye image and blocks the right eye image, and the right lens passes the right eye image and blocks the left eye image.

Conventional two-dimensional images can be displayed by 3D displays, by driving each pair of primary light sources with the same data. For example, the 2D red data values are used to drive both the red1 and the red2 primaries. Similarly, the 2D green data values are used to drive both the green1 and the green2 primaries, and the 2D blue data values are used to drive both the blue1 and blue2 primaries. The system is calibrated with the effective combined primaries and accurate images can be produced. However, the resulting color gamut can be limited significantly with respect to a desired color gamut (e.g., the established Rec 2020 gamut).

SUMMARY

The present invention overcomes the problems associated with the prior art by providing an improved means for displaying two-dimensional (2D) video data on a three-dimension (3D) display.

An example method for displaying image data includes identifying an established color gamut defined by a pre-defined number of primary colors and identifying a number of primary display colors associated with a light source, wherein the number of primary display colors associated with the light source exceeds the number of primary colors defining the established color gamut. The example method further includes defining a first virtual color gamut based on a combination of the primary display colors associated with the light source to approximate the established color gamut. Video data is received, which includes intensity values corresponding to a number of colors (e.g., 3) fewer than the number of primary colors associated with the light source (e.g., 6). The example method further includes generating intensity values associated with the first virtual color gamut based on the video data, and generating intensity values associated with the primary display colors of the light source based on the generated intensity values associated with the first virtual color gamut. The intensity values associated with the primary display colors are then provided to a spatial light modulator.

A particular example method further includes defining a second virtual color gamut, generating intensity values associated with the second virtual color gamut based on the video data, and using the intensity values associated with the second virtual color gamut in the step of generating the intensity values associated with the primary display colors. The second virtual color gamut is defined based on residual power of the light source after defining the first virtual color gamut. In a particular example method, the video data has a format associated with the established color gamut.

In a particular example method, the number of primary display colors is twice as large as the number of colors corresponding to the intensity values of the video data. In a more particular example method, the number of primary display colors is 6 and the video data includes intensity values corresponding to no more than 3 colors.

In an example method, at least one of the steps of generating intensity values associated with the first virtual color gamut based on the video data and generating intensity values associated with the second virtual color gamut based on the video data includes determining an intensity level indicated by the video data (e.g., a separate intensity level for each color associated with the video data) and generating the intensity values associated with at least one of the first virtual color gamut and the second virtual color gamut based on the intensity level indicated by the video data. The method additionally includes determining whether the intensity level indicated by the video data exceeds a predetermined intensity level (e.g., a separate predetermined intensity level for each color associated with the video data). If the intensity level indicated by the video data does not exceed the predetermined intensity level, then the intensity values associated with the first virtual gamut are generated based on the video data and the intensity values associated with the second virtual gamut are set to zero. On the other hand, if the intensity level indicated by the video data does exceed the predetermined intensity level, then an intensity value associated with the first virtual gamut is generated based on the predetermined intensity level, and intensity value associated with the second virtual gamut is generated based on an amount that the intensity level indicated by the video data exceeds the predetermined intensity level.

In one example method, the second virtual gamut is scaled to fit intensity values of the video data within an achievable gamut volume of the light source. The scaling is achieved, for example, by compressing the second virtual gamut toward white.

Another method includes clipping intensity values of at least one of the first virtual gamut and the second virtual gamut to fit within the achievable gamut volume of the light source. Optionally, the intensity values of at least one of the first virtual gamut and the second virtual gamut are clipped toward white. As another option, the intensity values of at least one of the first virtual gamut and the second virtual gamut are clipped to the edge of the achievable gamut volume in the direction of the negative primary.

Another example method includes modeling an achievable gamut volume of the first virtual gamut and the second virtual gamut and determining whether the generated intensity values of the first virtual gamut and the second virtual gamut fit within the modeled gamut volume. Intensity values of the first virtual gamut and the second virtual gamut that fit within the modeled gamut volume are left unmodified. Intensity values of the first virtual gamut and the second virtual gamut that do not fit within the modeled gamut volume are modified to fit within the modeled gamut volume. One example method of modifying the intensity values of the first virtual gamut and the second virtual gamut includes preserving the color balance (chromaticity) of the modified intensity values and reducing the intensity (e.g., magnitude) of the modified intensity values to fit within the achievable gamut volume. Another example method of modifying the intensity values of the first virtual gamut and the second virtual gamut includes preserving the intensity (e.g., magnitude) of the modified intensity values and adjusting the chromaticity of the modified intensity values towards a white point to fit within the achievable gamut volume. Yet another example method of modifying the intensity values of the first virtual gamut and the second virtual gamut includes reducing the intensity (e.g., magnitude) of the modified intensity values and adjusting the chromaticity of the modified intensity values towards a white point, whereby the intensity values are adjusted toward a surface of the achievable gamut volume.

An example display includes a light source, a spatial light modulator, and a controller. The light source includes a number of primary display colors (e.g., 6), which exceeds a number of primary colors (e.g., 3) defining an established color gamut. The spatial light modulator is illuminated by the light source. The controller is operative to receive video data including intensity values associated with a number of colors less than the number of primary display colors. The controller can be configured to receive video data having a format associated with the established color gamut. The controller generates intensity values associated with a first virtual color gamut based on the video data. The first virtual color gamut is defined by a combination of the primary display colors to match the established color gamut. The controller also generates intensity values for each of the primary display colors based on the intensity values associated with the first virtual gamut, and provides the intensity values for each of the primary display colors to the spatial light modulator.

In an example display, the controller is further operative to generate intensity values associated with a second virtual color gamut based on the video data. The second virtual color gamut is defined based on residual power of the light source considering the first virtual color gamut. The controller is further operative to generate intensity values associated with the second virtual color gamut based on the video data, and use the intensity values associated with the second virtual color gamut to generate the intensity values associated with the primary display colors.

In a particular embodiment, the number of primary display colors is twice as large as the number of colors corresponding to the intensity values of the video data. In a more particular embodiment, the number of primary display colors is 6 and the video intensity values correspond to no more than 3 colors.

In an example display, the controller is further operative to determine an intensity level indicated by the video data, and generate the intensity values associated with at least one of the first virtual color gamut and the second virtual color gamut based on the intensity level indicated by the video data. In one embodiment, the controller determines whether the intensity level indicated by the video data exceeds a predetermined intensity level. If the intensity level indicated by the video data does not exceed the predetermined intensity level, then the controller generates the intensity values associated with the first virtual gamut based on the video data and sets the intensity values associated with the second virtual gamut to zero. If the intensity level indicated by the video data does exceed the predetermined intensity level, then the controller generates an intensity value associated with the first virtual gamut based on the predetermined intensity level, and generates an intensity value associated with the second virtual gamut based on an amount by which the intensity level indicated by the video data exceeds the predetermined intensity level.

Optionally, the controller is operative to scale the second virtual gamut to fit intensity values of the video data within an achievable gamut volume of the light source. The scaling can include compressing the second virtual gamut toward white. As another option, the controller is operative to clip intensity values of at least one of the first virtual gamut and the second virtual gamut to fit within the achievable gamut volume of the light source. The intensity values of at least one of the first virtual gamut and the second virtual gamut can be clipped toward white, or the intensity values of at least one of the first virtual gamut and the second virtual gamut can be clipped to the edge of the achievable gamut volume.

Another example display incudes a modeler, a comparator, and a modifier. The modeler is operative to model an achievable gamut volume of the first virtual gamut and the second virtual gamut, in view of the light source capabilities. The comparator determines whether the generated intensity values of the first virtual gamut and the second virtual gamut fit within the modeled gamut volume. The modifier leaves the intensity values of the first virtual gamut and the second virtual gamut that fit within the modeled gamut volume unmodified, but modifies intensity values of the first virtual gamut and the second virtual gamut that do not fit within the modeled gamut volume, so that the modified values will fit within the modeled gamut volume. In a particular example display, the modifier is operative to preserve the color balance of the modified intensity values and reduce the intensity (e.g., magnitude) of the intensity values to fit within the achievable gamut volume. In another particular example display, the modifier is operative to preserve the intensity (e.g., magnitude) of the modified intensity values and adjust the chromaticity of the modified intensity values towards a white point to fit within the achievable gamut volume. In yet another particular example display, the modifier is operative to reduce the intensity (e.g., magnitude) of the modified intensity values and adjust chromaticity of the modified intensity values towards a white point, whereby the intensity values are adjusted toward a surface of the achievable gamut volume.

Any of the methods disclosed herein can be implemented with a non-transitory, electronically-readable medium having code embodied therein for causing a display device to perform the methods.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a display system and display for displaying video data defining a first number of primary colors using an illumination source defining a second, greater number of primary light source colors. In the following description, numerous specific details are set forth (e.g., projector environment) in order to provide a thorough understanding of the invention. Those skilled in the art will recognize, however, that the invention may be practiced apart from these specific details. In other instances, details of well-known video processing practices and components have been omitted, so as not to unnecessarily obscure the present invention.

Figure 1:
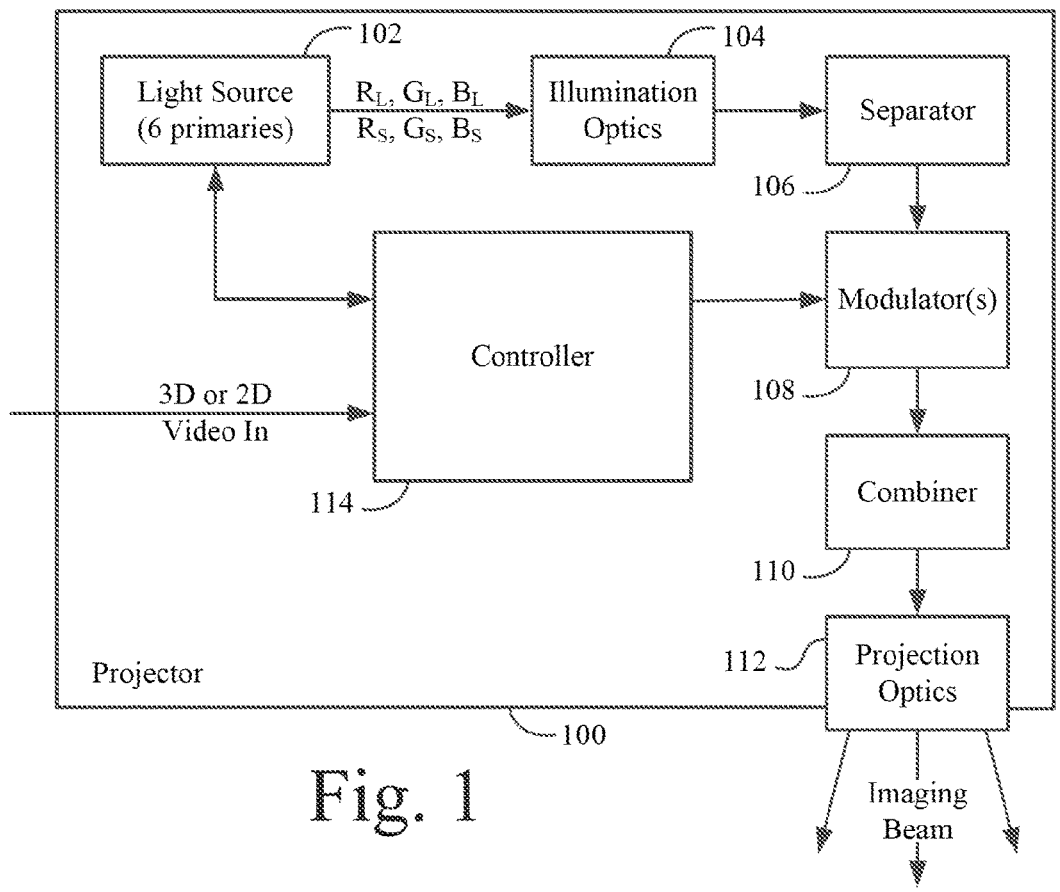
FIG. 1 is a block diagram of an example 3D display system.

FIG. 1 is a block diagram of an example 3D display system 100 capable of displaying 2D video data with an improved color gamut. In this example embodiment, display system 100 is a projector including a light source 102 with 6 primary colors (e.g., laser light sources), illumination optics 104, a separator 106, one or more modulators 108, a combiner 110, projection optics 112, and a controller 114. Light source 102 produces an illumination beam including the six primary colors and directs the illumination beam through illumination optics 104 and into color separator 106. Color separator 106 separates the multicolored beam into the 6 primary beams and directs each primary beam to an associated one of spatial light modulators 108. After the primary illumination beams are modulated, projection optics 112 focuses the modulated beam to form an imaging beam, which is projected onto a viewing surface (not shown).

In this example embodiment, there is an individual modulator for each primary color. However, the number of modulators can be reduced using a field sequential modulation scheme. In another example embodiment, the light sources, the modulators, and other components of the projector can be separated into two separate, but coordinated projectors. In yet another embodiment, the modulators can include a plurality of modulators for each primary color, as, for example, in a dual modulation projector.

Figure 2:
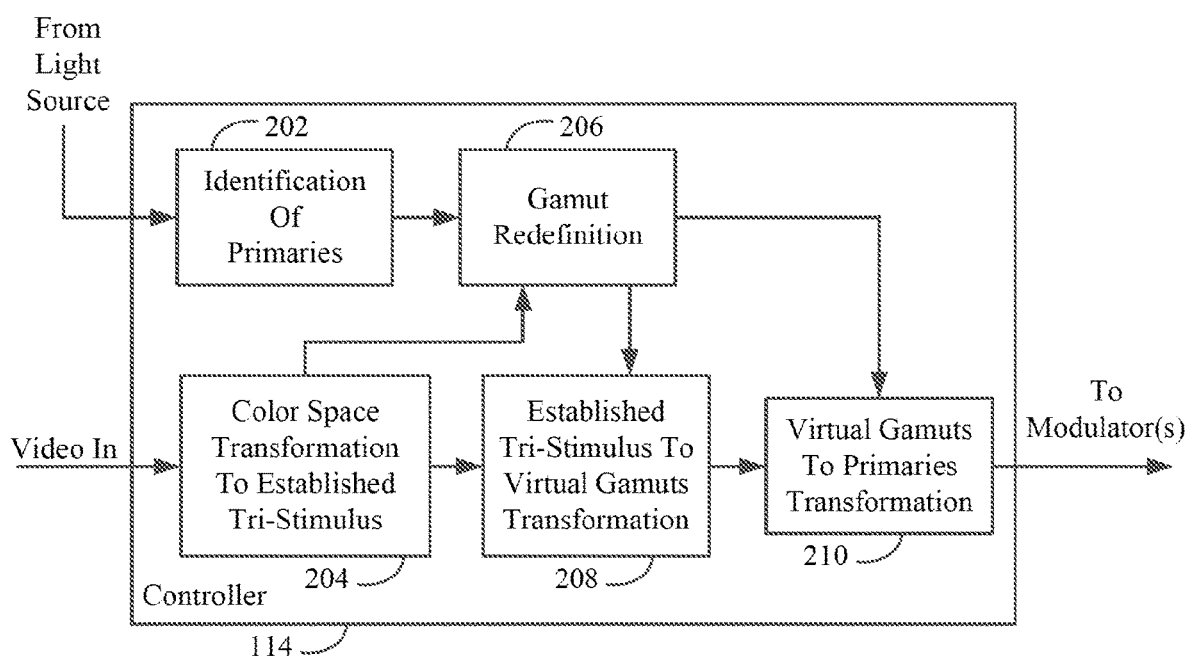
FIG. 2 is a block diagram of the controller of the 3D display system of FIG. 1.

FIG. 2 is a block diagram of an example controller 114 of the 3D display system of FIG. 1. Controller 114 includes an Identification of Primaries Module for receiving and/or storing information (e.g., calibration data) about the primary colors of light source 102. A Color Space Transformation module 204 transforms incoming 2D video data into an established tri-stimulus color space (e.g., Rec2020), if necessary. A Gamut Redefinition module 206 defines one or more virtual gamuts based on the target established color gamut and the primaries of light source 102. An Established Tri-Stimulus To Virtual Gamut Transformation module 208 converts video data into intensity values associated with the virtual gamut(s). Then, a Virtual Gamuts To Primaries Transformation module 210 converts the intensity values of the virtual gamut(s) into intensity values corresponding to the primaries of the light source and provides the resulting intensity values to the modulators.

Figure 3:
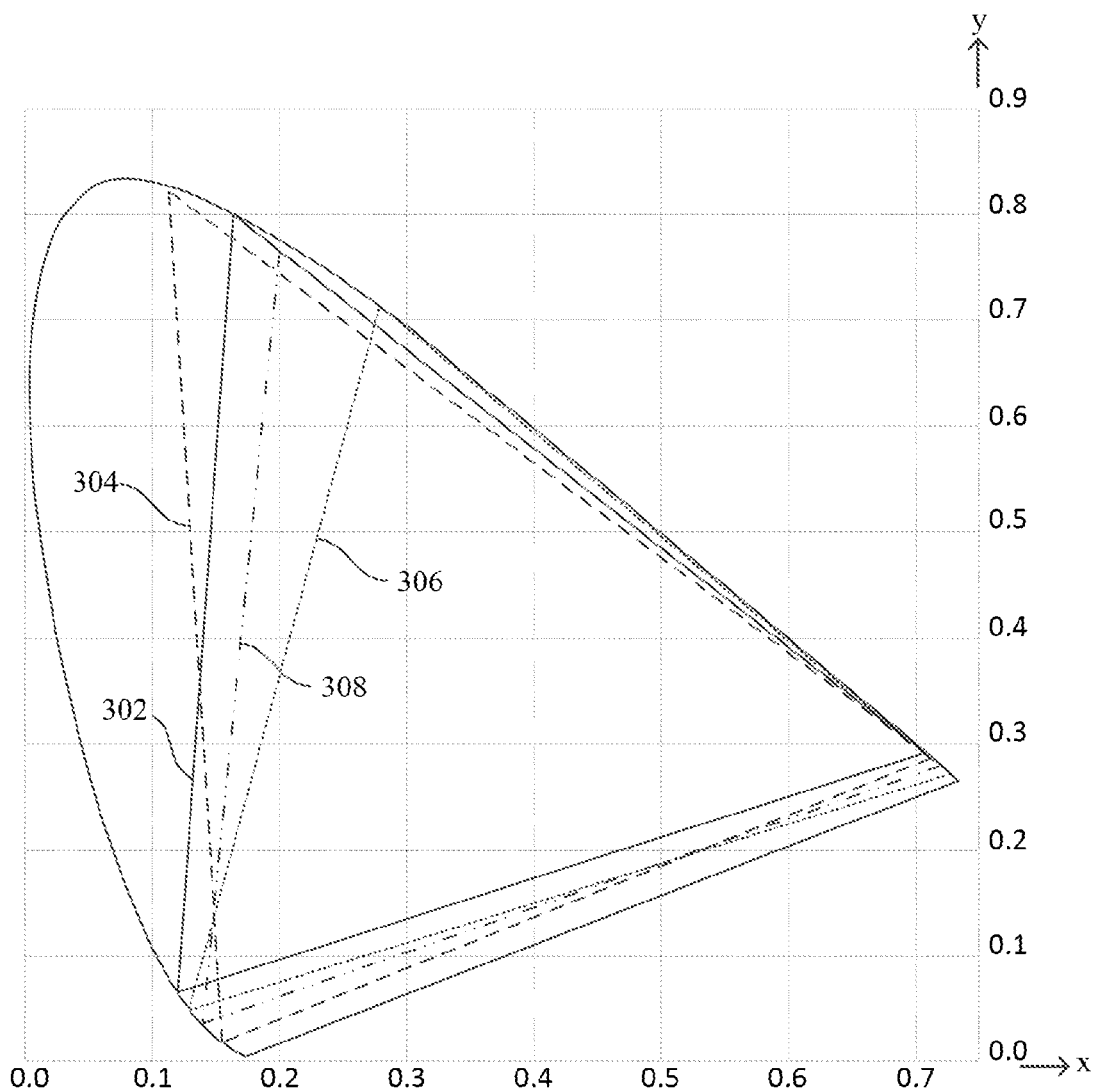
FIG. 3 is a chromaticity chart showing color gamuts associated with multiple display primary light sources.

FIG. 3 is a CIE 1931 chromaticity chart showing color gamuts associated with the multiple display primary light sources and the target established color gamut (Rec2020). Gamut 302 is the Rec2020 gamut. Gamut 304 is the gamut defined by the first 3 light source primaries ($R_L$, $G_L$, and $B_L$), which provide illumination for a right eye image when the projector is operating in 3D mode. Gamut 306 is the gamut defined by the second 3 light source primaries ($R_S$, $G_S$, and $B_S$), which provide illumination for a left eye image when the projector is operating in 3D mode. Gamut 308 is the gamut defined by driving the left eye primaries and the right eye primaries with the same values. As shown, gamut 308 significantly differs from Rec2020 gamut 302.

Figure 4:
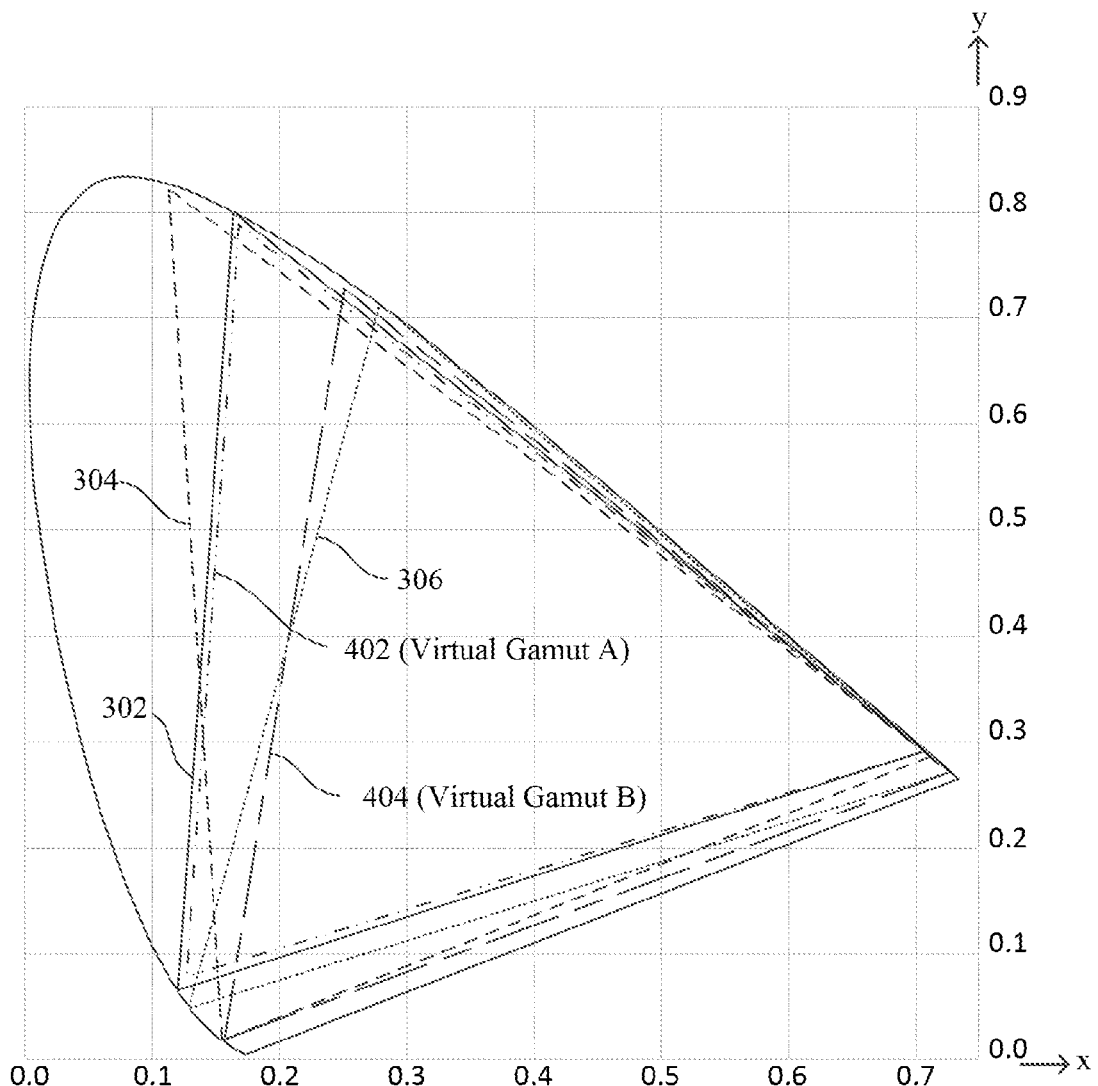
FIG. 4 is a chromaticity chart showing virtual color gamuts associated with multiple display primary light sources.

FIG. 4 is a chromaticity chart showing virtual color gamuts generated from the multiple display primary light sources. Gamuts 302, 306, and 304 of FIG. 3 are also shown for comparison. Virtual gamut 402 (Gamut A), is defined as a combination of the 6 primary light sources to closely approximate Rec2020 gamut 302. Virtual gamut 404 (Gamut B) is defined by the residual power of the 6 primary light sources. In other words, Gamut B is defined by the left over light output of the 6 primaries after the light required for Gamut A has been subtracted. As shown, virtual gamut 402 (Gamut A) matches the Rec2020 gamut 302 much more closely than the simple summation gamut 308 (FIG. 3).

The disclosed system optimizes the gamut volume for 2D images by driving the left and right eye signals differently (even though the content is only 2D and no glasses are worn). The gamut volume is divided into the two virtual gamuts: Gamut A and Gamut B. Each gamut uses virtual primaries that are specific blends of the original 6P primaries. The 'A' gamut is optimized to be as close to possible as Rec2020. The 'B' gamut uses the residual energy from the 6 primaries. The 'A' and 'B' gamuts are show in FIG. 4. Note that the 'A' gamut is very close to Rec2020.

Values in the 'A' and 'B' gamuts can be converted to the 6P primaries ($R_L$, $G_L$, $B_L$, $R_S$, $G_S$, $B_S$) using "blend" matrices as follows:

$$\begin{bmatrix} R_L \\ G_L \\ B_L \end{bmatrix} = [B_{AL}] \begin{bmatrix} R_A \\ G_A \\ B_A \end{bmatrix} + [B_{BL}] \begin{bmatrix} R_B \\ G_B \\ B_B \end{bmatrix}$$

and $$\begin{bmatrix} R_S \\ G_S \\ B_S \end{bmatrix} = [B_{AS}] \begin{bmatrix} R_A \\ G_A \\ B_A \end{bmatrix} + [B_{BS}] \begin{bmatrix} R_B \\ G_B \\ B_B \end{bmatrix}$$

Typical values for the blend matrices $[B_{AL}]$, $[B_{AS}]$, $[B_{BL}]$, and $[B_{BS}]$ are:

```
float B_AL[3][3]=
{
    { 0.0000f, 0.0000f, 0.0000f },
    { 0.0000f, 0.2859f, 0.0000f },
    { 0.0000f, 0.0000f, 0.9578f }
};
float B_AS[3][3] =
{
    { 0.9903f, 0.0000f, 0.0000f },
    { 0.0097f, 0.7141f, 0.0422f },
    { 0.0000f, 0.0000f, 0.0000f }
};
float B_BL[3][3] =
{
    { 1.0000f, 0.0000f, 0.0000f },
    { 0.0000f, 0.7141f, 0.0000f },
    { 0.0000f, 0.0000f, 0.0422f }
};
float B_BS[3][3] =
{
    { 0.0097f, 0.0000f, 0.0000f },
    { 0.0000f, 0.2340f, 0.0000f },
    { 0.0000f, 0.0000f, 1.0000f }
};
```

The 'A' gamut is used for lower luminance levels and the 'B' gamut is added, where necessary, to achieve higher luminance levels. The 'A' gamut services approximately 50% of the luminance range, above which the less-favorable 'B' gamut is added. 50% of the linear luminance range represents all but the last stop of the perceptual range and, therefore, most of perceptual range can be handled with the 'A' gamut. Above that range the 'B' gamut is added and the gamut volume tapers towards the top. Hence, the vast majority of the perceptual range can be achieved with approximately Rec2020 gamut, and yet the full luminance range can still be achieved.

Although the 'B' gamut can represent chromaticities that are outside the 'A' gamut, it would be counter-intuitive for a colorist to utilize chromaticities that are only available at higher luminance values. Therefore the 'B' gamut would be limited to the intersection of the achievable 'B' gamut and the 'A' gamut.

There is a desire in the industry not to utilize colors outside the Rec2020 gamut. This is easily achieved by representing the source images in RGB with Rec2020 primaries and disallowing negative values. Content color-graded this way will never produce values outside Rec2020. When the content is packaged for distribution, it is transformed into a DCI-compliant package represented by CIE 1931 XYZ tri-stimulus values. Although XYZ can represent colors outside Rec2020, so long as the source was constrained to Rec2020, excursions in XYZ will never exceed Rec2020.

The methods in this disclosure cover various means for implementing this. The first two methods are computationally efficient and could easily be implemented in a simple filed-programmable gate array (FPGA) circuit. The third method is more computationally intensive and would typically be implemented in a graphics processor unit (GPU).

Method 1—Gamut Scaling

In this method two functions are defined:

$f_l(C) = $ if $(C<0.5)C$, else $0.5$ $f_u(C) = $ if $(C<0.5)0$, else $C-0.5$ $C \in R_{2020}, G_{2020}, B_{2020}$ For all incoming tri-stimulus pixel values (denoted $R_{2020}$), the 'A' and 'B' gamut signals are derived as follows:

$$\begin{bmatrix} R_A \\ G_A \\ B_A \end{bmatrix} = \begin{bmatrix} f_l(R_{2020}) \\ f_l(G_{2020}) \\ f_l(B_{2020}) \end{bmatrix}$$

and $$\begin{bmatrix} R_B \\ G_B \\ B_B \end{bmatrix} = \begin{bmatrix} f_u(R_{2020}) \\ f_u(G_{2020}) \\ f_u(B_{2020}) \end{bmatrix}$$

The signals representing the 'A' gamut ($R_A$, $G_A$, $B_A$) and the signals representing the 'B' gamut ($R_B$, $G_B$, $B_B$) then drive the 6P primaries according to the blend matrixes $[B_{AL}]$, $[B_{AS}]$, $[B_{BL}]$, and $[B_{BS}]$ described above.

In this method, for luminance values above 50%, all RGB values are moved towards white to fit within the available gamut volume.

Method 2—Gamut Clipping

In this method two functions are defined:

$f_l(C) = $ if $(maxRGB > 0.5)$, $C * \dfrac{0.5}{\text{Max}RGB}$, else $C$ $f_u(C) = C - f_l(C)$ $C \in R_{2020}, G_{2020}, B_{2020}$ For all incoming tri-stimulus pixel values (denoted $R_{2020}$), the full unclipped 'A' and 'B' gamut signals are derived as follows:

$$\begin{bmatrix} R_{Af} \\ G_{Af} \\ B_{Af} \end{bmatrix} = [C]_A \begin{bmatrix} f_l(R_{2020}) \\ f_l(G_{2020}) \\ f_l(B_{2020}) \end{bmatrix}$$

and $$\begin{bmatrix} R_{Bf} \\ G_{Bf} \\ B_{Bf} \end{bmatrix} = [C]_B \begin{bmatrix} f_u(R_{2020}) \\ f_u(G_{2020}) \\ f_u(B_{2020}) \end{bmatrix};$$

where $[C]_A$ and $[C]_B$ are derived as will be described hereinafter.

These are then clipped as follows:

$$\begin{bmatrix} R_A \\ G_A \\ B_A \end{bmatrix} = \begin{bmatrix} \max(R_{Af}, 0) \\ \max(G_{Af}, 0) \\ \max(B_{Af}, 0) \end{bmatrix}$$

$$\begin{bmatrix} R_B \\ G_B \\ B_B \end{bmatrix} = \begin{bmatrix} \max(R_{Bf}, 0) \\ \max(G_{Bf}, 0) \\ \max(B_{Bf}, 0) \end{bmatrix}$$

In this method, values within the achievable gamut volume are left untouched and values outside (with negative RGB values) are clipped to the edge of the gamut in the direction of the negative primary.

An alternative method instead clips towards white:

$$\min_A = \min(R_{Af}, G_{Af}, B_{Af});$$

if $(\min_A < 0)$ then $$\begin{bmatrix} R_A \\ G_A \\ B_A \end{bmatrix} = \begin{bmatrix} R_{Af} - \min_A \\ G_{Af} - \min_A \\ B_{Af} - \min_A \end{bmatrix}$$

$$\min_B = \min(R_{Bf}, G_{Bf}, B_{Bf});$$

if $(\min B < 0)$ then $$\begin{bmatrix} R_B \\ G_B \\ B_B \end{bmatrix} = \begin{bmatrix} R_{Bf} - \min_B \\ G_{Bf} - \min_B \\ B_{Bf} - \min_B \end{bmatrix}$$

Again, the signals representing the 'A' gamut $(R_A, G_A, B_A)$ and the signals representing the 'B' gamut $(R_B, G_B, B_B)$ then drive the 6P primaries according to the blend matrices described above.

$[C]_A$ and $[C]_B$ used above to convert tri-stimulus values to full, unclipped A and B gamut values are derived as follows. As indicated above, two sets of three primaries of the virtual A and B gamuts $\{R_A, G_A, B_A\}$ and $\{R_B, G_B, B_B\}$ are related to the long and short primaries of the display $\{R_L, G_L, B_L\}$ and $\{R_S, G_S, B_S\}$ according to the following blend matrices:

$$\begin{bmatrix} R_L \\ G_L \\ B_L \end{bmatrix} = [B_{AL}] \begin{bmatrix} R_A \\ G_A \\ B_A \end{bmatrix} + [B_{BL}] \begin{bmatrix} R_B \\ G_B \\ B_B \end{bmatrix} \quad [1]$$

and $$\begin{bmatrix} R_S \\ G_S \\ B_S \end{bmatrix} = [B_{AS}] \begin{bmatrix} R_A \\ G_A \\ B_A \end{bmatrix} + [B_{BS}] \begin{bmatrix} R_B \\ G_B \\ B_B \end{bmatrix} \quad [2]$$

Knowing the Normalized Primary Matrixes for $\{R_L, G_L, B_L\}$ and $\{R_S, G_S, B_S\}$, the XYZ value for arbitrary points in $\{R_L, G_L, B_L\}$ and $\{R_S, G_S, B_S\}$ is:

$$\begin{bmatrix} X \\ Y \\ Z \end{bmatrix} = [NPM]_{LLL} \begin{bmatrix} R_L \\ G_L \\ B_L \end{bmatrix} + [NPM]_{SSS} \begin{bmatrix} R_S \\ G_S \\ B_S \end{bmatrix}$$

Substituting [1], [2]:

$$\begin{bmatrix} X \\ Y \\ Z \end{bmatrix} = [NPM]_{LLL} \left\{ [B_{AL}] \begin{bmatrix} R_A \\ G_A \\ B_A \end{bmatrix} + [B_{BL}] \begin{bmatrix} R_B \\ G_B \\ B_B \end{bmatrix} \right\} +$$

$$[NPM]_{SSS} \left\{ [B_{AS}] \begin{bmatrix} R_A \\ G_A \\ B_A \end{bmatrix} + [B_{BS}] \begin{bmatrix} R_B \\ G_B \\ B_B \end{bmatrix} \right\}$$

$$\begin{bmatrix} X \\ Y \\ Z \end{bmatrix} = [NPM]_{LLL}[B_{AL}] \begin{bmatrix} R_A \\ G_A \\ B_A \end{bmatrix} + [NPM]_{SSS}[B_{AS}] \begin{bmatrix} R_A \\ G_A \\ B_A \end{bmatrix} +$$

$$[NPM]_{SSS}[B_{BS}] \begin{bmatrix} R_B \\ G_B \\ B_B \end{bmatrix} + [NPM]_{LLL}[B_{BL}] \begin{bmatrix} R_B \\ G_B \\ B_B \end{bmatrix}$$

$$\begin{bmatrix} X \\ Y \\ Z \end{bmatrix} = \{[NPM]_{LLL}[B_{AL}] + [NPM]_{SSS}[B_{AS}]\} \begin{bmatrix} R_A \\ G_A \\ B_A \end{bmatrix} +$$

$$\{[NPM]_{SSS}[B_{BS}] + [NPM]_{LLL}[B_{BL}]\} \begin{bmatrix} R_B \\ G_B \\ B_B \end{bmatrix}$$

Putting in terms of primary matrices (Note $[PM]_A$ and $[PM]_B$ are not normalized primary matrices. Although the middle row of $[NPM]_{LLL}$ and $[NPM]_{SSS}$ each sum to 1, $[PM]_{A,B}$ take arbitrary blends of each column so the resulting middle row no longer sums to 1.):

$$\begin{bmatrix} X \\ Y \\ Z \end{bmatrix} = [PM]_A \begin{bmatrix} R_A \\ G_A \\ B_A \end{bmatrix} + [PM]_B \begin{bmatrix} R_B \\ G_B \\ B_B \end{bmatrix}$$

where:

$[PM]_A = [NPM]_{LLL}[B_{AL}] + [NPM]_{SSS}[B_{AS}]$

Similarly:

$[PM]_B = [NPM]_{SSS}[B_{BS}] + [NPM]_{LLL}[B_{BL}]$

Given the normalized primary matrix for Rec2020

$[NPM]_{2020}$, then:

$[C]_A = [PM]_A^{-1}[NPM]_{2020}$, and $[C]_B = [PM]_B^{-1}[NPM]_{2020}$.

Method 3—Gamut Volume Modelling

In this method, the gamut volume achievable by utilizing the 'A' gamut for low luminance values and the 'B' gamut for higher luminance values, is modeled such that tri-stimulus values can be tested to determine whether they fall within the achievable gamut volume or not.

In one method, tri-stimulus values within the achievable gamut volume are unmodified. For values outside the gamut volume, the ratio of RGB values is preserved but the values are scaled to reduce luminance to fit within the available gamut volume.

In an alternative method, again the values within the achievable gamut volume are unmodified. For values outside the gamut volume, the luminance is preserved, but chromaticity is moved towards the mastering white point (e.g. D6500) to fit within the gamut volume.

In another method, tri-stimulus values within some threshold of the surface of the gamut volume would be dropped in luminance or moved towards the white point to achieve a "soft clip" to the surface of the gamut volume. This may reduce artifacts in cases where high luminance saturated colors are utilized heavily.

Flowcharts Summarizing Example Methods

Figure 5:
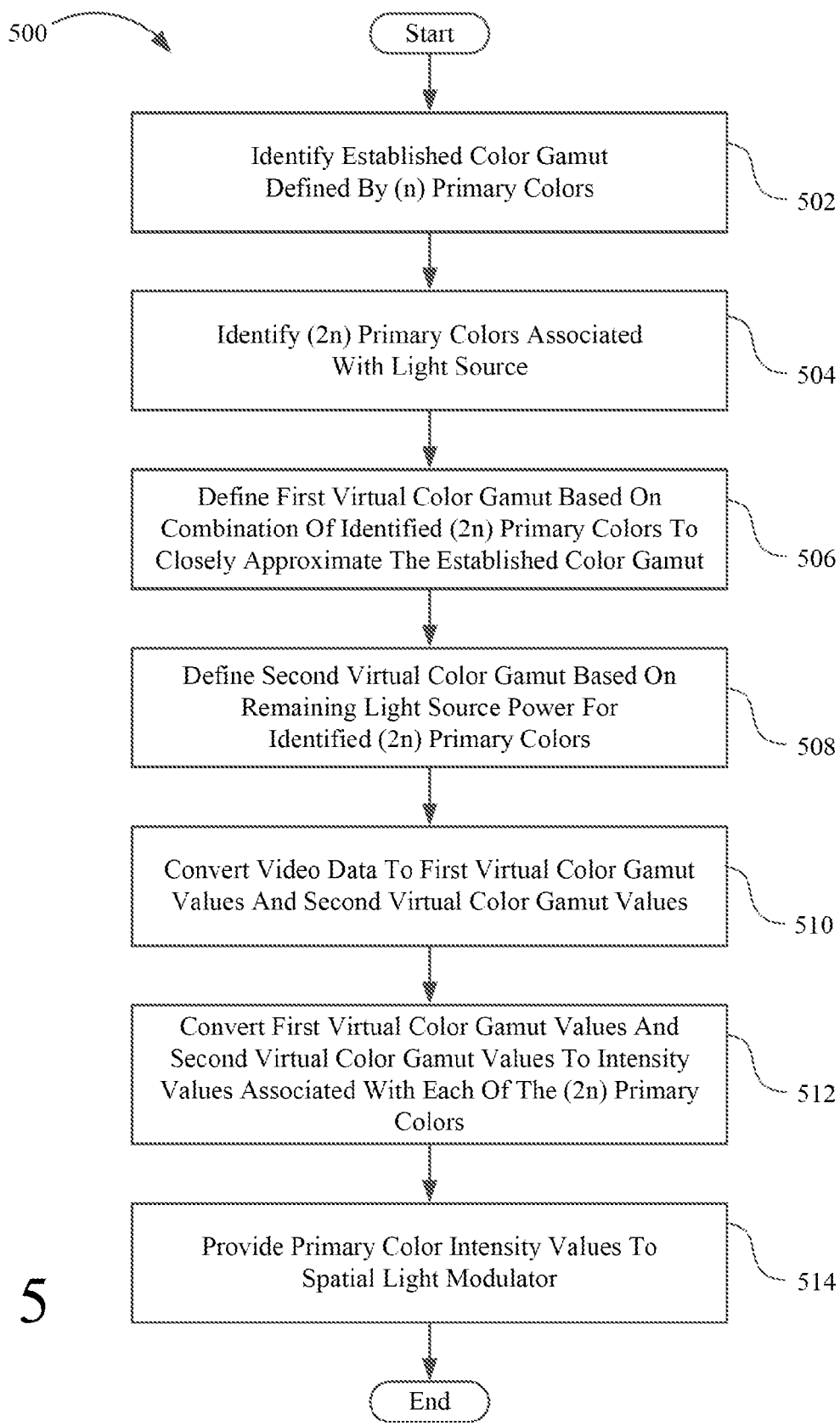
FIG. 5 is a flow chart summarizing an example method of displaying 2D images on a 3D display.

FIG. 5 is a flow chart summarizing an example method 500 of displaying 2D images on a 3D display. In a first step 502, an established color gamut defined by a number (e.g., 3) primary colors is identified. Then, in a second step 504 a different number (e.g., 6) of primary display colors associated with a light source are identified. Next, in a third step 506, a first virtual gamut is defined based on a combination of the identified primary display colors to closely approximate the identified established gamut. In a fourth step 508, a second virtual gamut is defined based on the residual light source power for the primary display colors. Then, in a fifth step 510, video data is converted to intensity values of the first and second virtual gamuts. Next, in a sixth step 512, the intensity values of the first and second virtual gamuts are converted to intensity values associated with the primary display colors. Then, in a seventh step 514, the intensity values associated with the primary display colors are provided to one or more spatial light modulators.

Figure 6A:
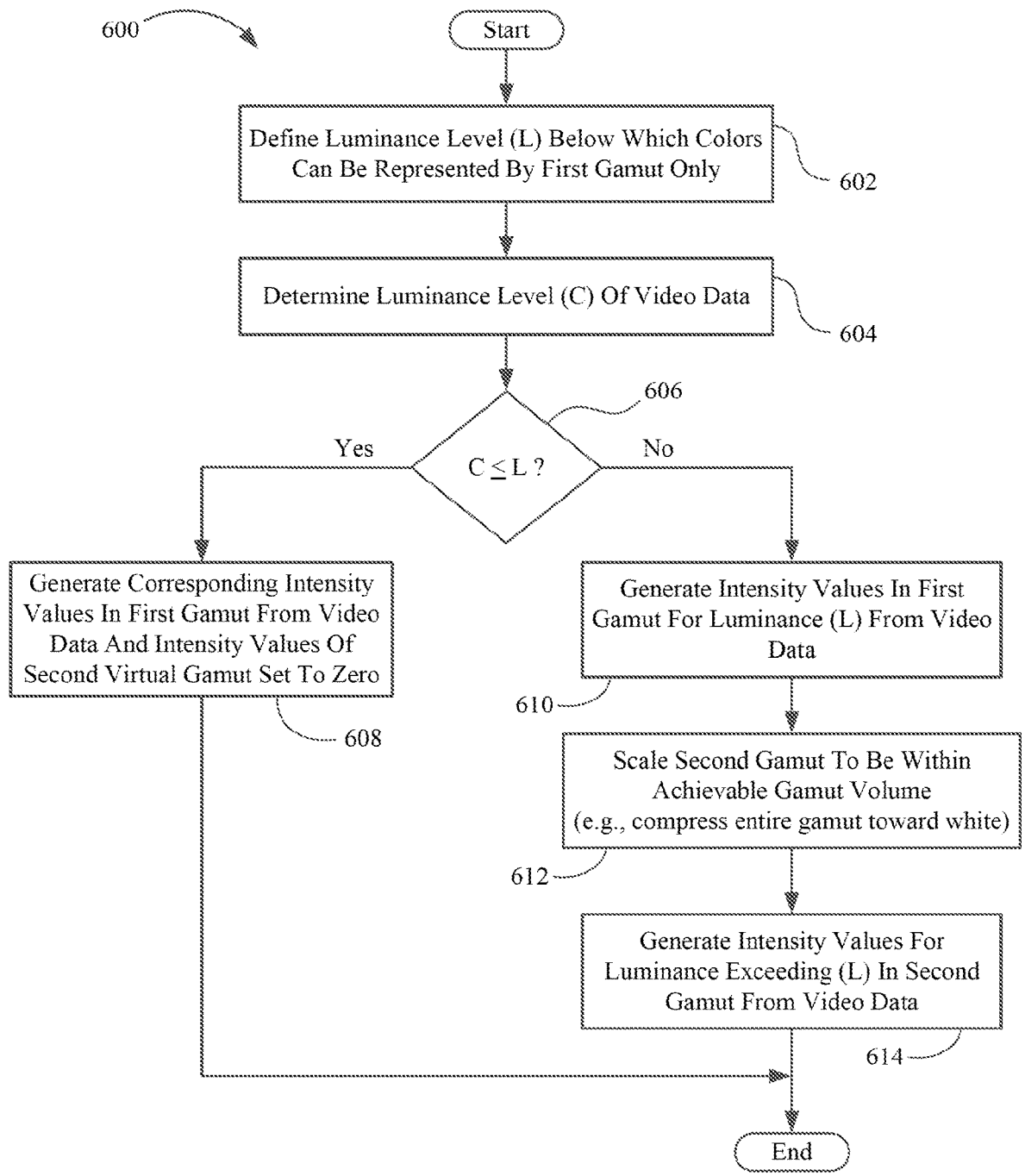
FIG. 6A is a flow chart summarizing an example method of performing a step of converting video data to first and second virtual color gamut values.

FIG. 6A is a flow chart summarizing an example method 600 of performing a step of converting video data to intensity values associated with the first and second virtual color gamuts. In a first step 602, a luminance level (L) at or below which colors can be represented by the first virtual color gamut alone is defined. Then, in a second step 604, the luminance level of video data is determined. Next, in a third step 606, it is determined whether the luminance level of the video data is at or below the defined luminance level (L). If it is determined that the luminance level of the video data is at or below the defined luminance level (L), then, in a fourth step 608, intensity values associated with the first virtual gamut are generated from the video data, and the intensity values associated with the second virtual gamut are set to zero.

If, in third step 606 it is determined that the luminance level of the video data is above the defined luminance level (L), then, in a fifth step 610, intensity values associated with the first virtual gamut are generated corresponding to the luminance level (L). Next, in a sixth step 612, the second gamut is scaled to be within an achievable gamut volume of the light source. Then, in a seventh step 614, intensity levels associated with the second virtual gamut are generated corresponding to an amount that the luminance level of the video data exceeds the defined luminance level (L).

Figure 6B:
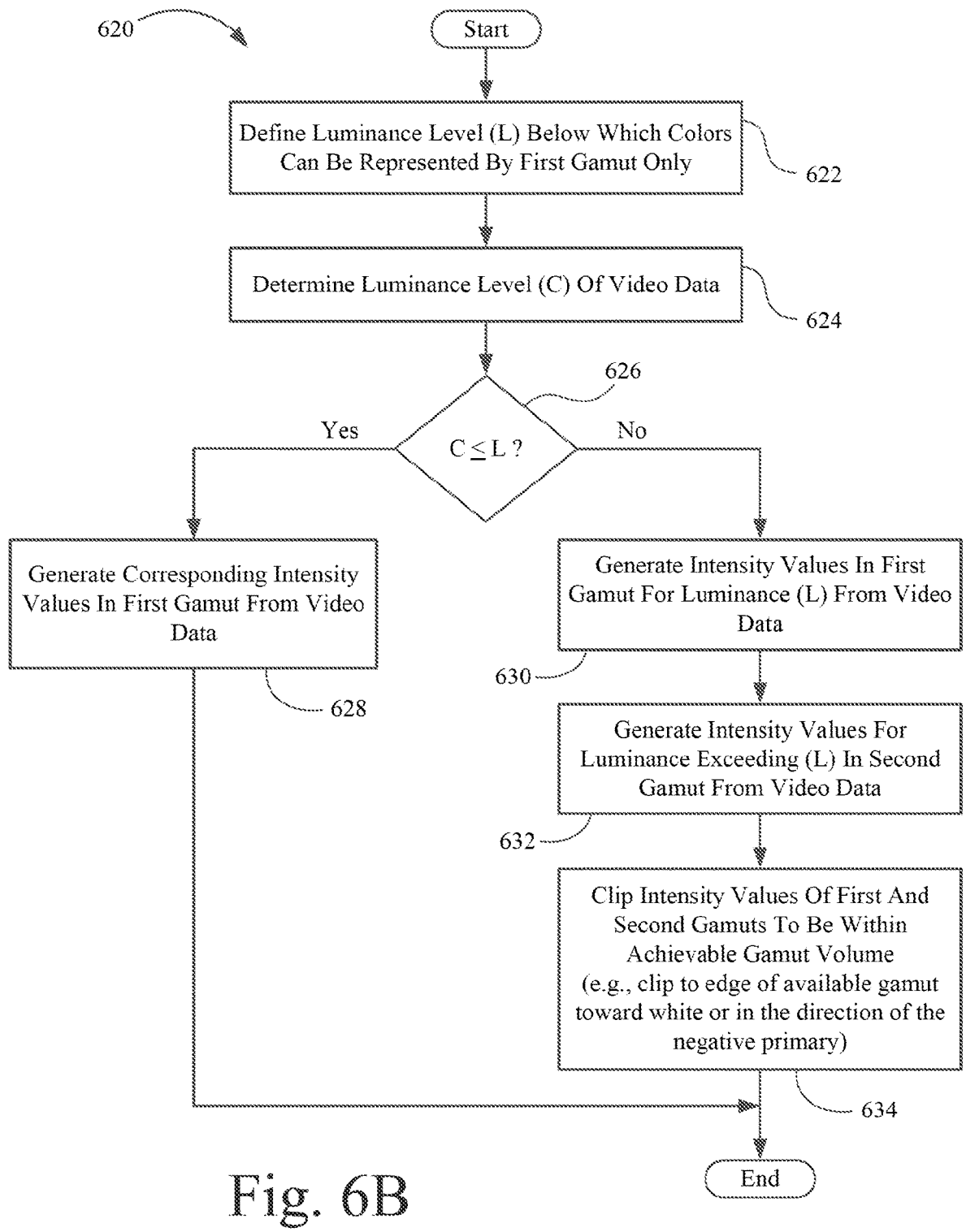
FIG. 6B is a flow chart summarizing another example method of performing a step of converting video data to first and second virtual color gamut values.

FIG. 6B is a flow chart summarizing another example method 620 of performing a step of converting video data to intensity values associated with the first and second virtual color gamuts. In a first step 622, a luminance level (L) at or below which colors can be represented solely by the first virtual color gamut is defined. Then, in a second step 624, the luminance level of video data is determined. Next, in a third step 626, it is determined whether the luminance level of the video data is at or below the defined luminance level (L). If it is determined that the luminance level of the video data is at or below the defined luminance level (L), then, in a fourth step 628, intensity values associated with the first virtual color gamut are generated from the video data, and the intensity values associated with the second virtual color gamut are set to zero.

If, in third step 626 it is determined that the luminance level of the video data is above the defined luminance level (L), then, in a fifth step 630, intensity values associated with the first virtual gamut are generated corresponding to the luminance level (L). Next, in a sixth step 632, intensity levels associated with the second virtual gamut are generated corresponding to an amount that the luminance level of the video data exceeds the defined luminance level (L). Then, in a seventh step 634, the intensity values associated with the first and second virtual gamuts are clipped to be within the achievable gamut volume.

Figure 6C:
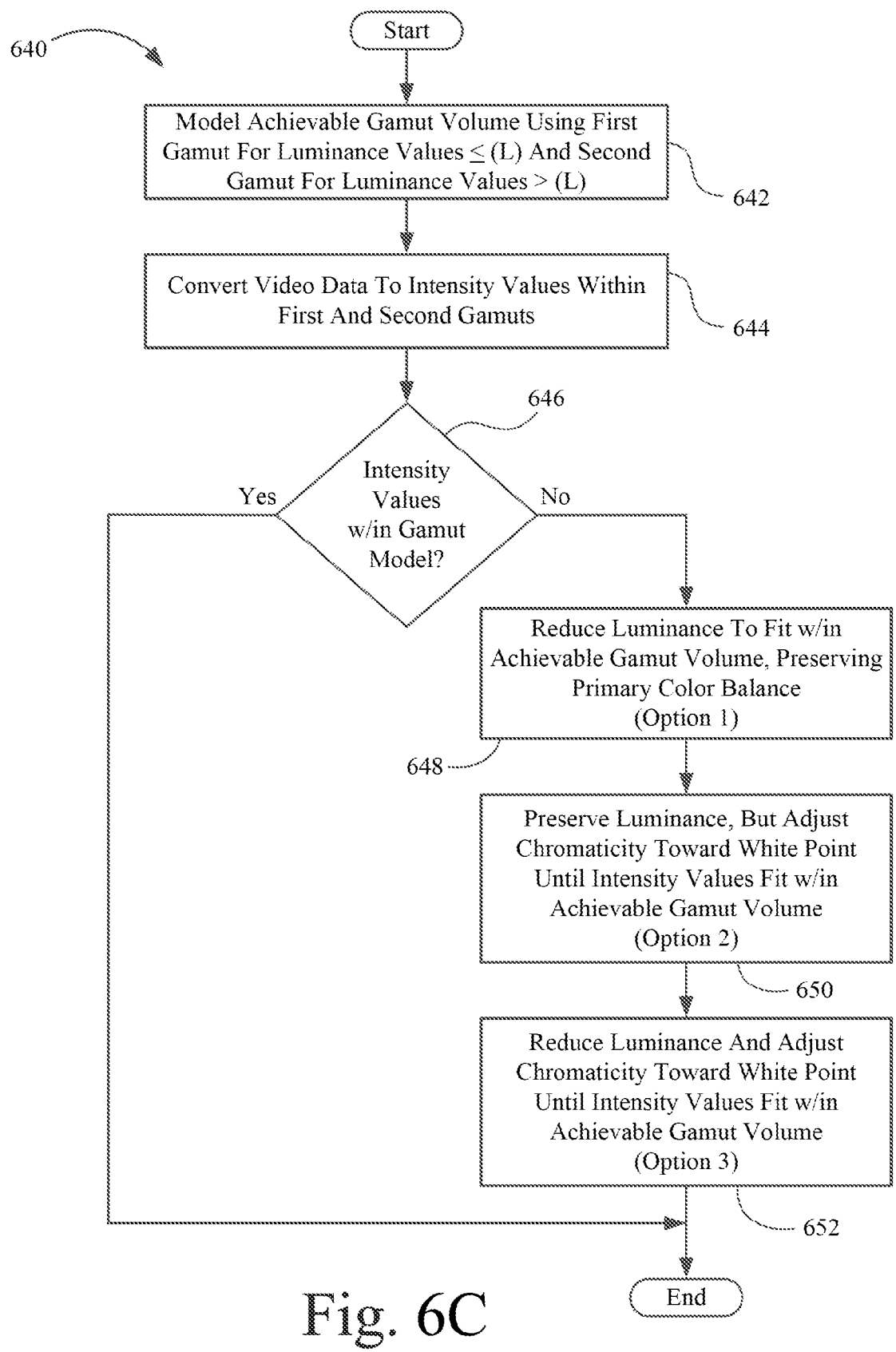
FIG. 6C is a flow chart summarizing yet another example method of performing a step of converting video data to first and second virtual color gamut values.

FIG. 6C is a flow chart summarizing yet another example method 640 of performing a step of converting video data to first and second virtual color gamut values. In a first step 642, an achievable gamut volume of the light source is modeled using the first virtual gamut for luminance values at or below a predetermined luminance level (L). Then, in a second step 644, video data is converted to intensity values associated with the first and second virtual color gamuts. Next, in a third step 646, it is determined whether the intensity values associated with the first and second virtual color gamuts fit within the modeled gamut volume. It the intensity values associated with the first and second virtual color gamuts do fit within the modeled gamut volume, method 640 ends. Otherwise, the intensity values associated with the first and second virtual color gamuts are modified according to one of the following optional steps. In an optional fourth step 648, the luminance of the intensity values associated with the first and second virtual color gamuts is reduced, while preserving the primary color balance of the data, until the intensity values fit within the modeled gamut volume. In an optional fifth step 650, the luminance of the intensity values associated with the first and second virtual color gamuts is preserved, but chromaticity is adjusted towards a white point until the intensity values fit within the modeled gamut volume. In an optional sixth step 652, the luminance of the intensity values associated with the first and second virtual color gamuts is reduced and the chromaticity is adjusted toward the white point until the intensity values associated with the first and second virtual color gamuts fit within the modeled gamut volume, thus achieving a "soft clip" to the surface of the gamut volume.

The description of particular embodiments of the present invention is now complete. Many of the described features may be substituted, altered or omitted without departing from the scope of the invention. For example, the example embodiment is a shown as a projector. However, the inventive methods and components can be employed in a color grading desk. As another option, the methods and components of this disclosure can be embodied in an intermediate device interposed between a color grading desk and a projector or other display. This and other deviations from the particular embodiments shown will be apparent to those skilled in the art, particularly in view of the foregoing disclosure.

The invention claimed is:

1. A method for displaying image data, the method comprising:
    receiving video data having a format associated with an established color gamut defined by a predefined number of primary colors;
    defining a first virtual color gamut based on a combination of a number of primary display colors associated with a light source to approximate said established color gamut, the number of primary display colors associated with said light source exceeding the number of primary colors defining the established color gamut;
    defining a second virtual color gamut based on residual power of said light source considering said first virtual gamut;
    determining luminance levels indicated by the video data;
    generating intensity values associated with said first virtual color gamut based on said luminance levels indicated by said video data and generating intensity values associated with said second virtual color gamut based on said luminance levels indicated by said video data, wherein only said first virtual color gamut is used for luminance levels in a lower part of a luminance range associated with the light source and both said first virtual gamut and said second virtual color gamut is used for luminance levels in an upper part of the luminance range associated with the light source;
    receiving first and second blend matrices for calculating a weighted combination of said intensity values associated with said first virtual color gamut and said intensity values associated with said second virtual color gamut;

generating intensity values associated with the primary display colors of the light source by calculating a weighted combination of said intensity values associated with said first virtual color gamut and said intensity values associated with said second virtual color gamut, wherein said weighted combination is calculated by applying said first blend matrix to said intensity values associated with said first virtual gamut to obtain a first result, applying said second blend matrix to said intensity values associated with said second virtual gamut to obtain a second result, and adding the first and second results; and providing the intensity values associated with the primary display colors of the light source to a spatial light modulator.

2. The method according to claim 1, wherein the established color gamut is a Rec2020 gamut.

3. The method according to claim 1, wherein the number of primary display colors is twice as large as the number of colors corresponding to the intensity values of the video data.

4. The method according to claim 3, wherein the number of primary display colors is six and the number of colors corresponding to the intensity values of the video data is three or fewer.

5. The method according to claim 1, wherein the determining the luminance levels indicated by the video data includes determining a separate luminance level for each color of the number of colors represented by the video data.

6. The method according to claim 1 further comprising compressing the second virtual color gamut toward white.

7. The method according to claim 1 further comprising clipping intensity values of at least one of the first virtual color gamut and the second virtual color gamut toward white.

8. The method according to claim 1 further comprising clipping values of the first virtual color gamut and/or the second virtual color gamut that are outside an achievable gamut volume of the light source towards the achievable gamut volume.

9. The method according to claim 1 further comprising clipping values of the first virtual color gamut and/or the second virtual color gamut that are outside an achievable gamut volume of the light source towards the achievable gamut volume without clipping the values of the first virtual color gamut and the second virtual color gamut that are within the achievable gamut volume.

10. The method according to claim 1 wherein the first virtual color gamut comprises at least three virtual primaries having associated intensity values and wherein the second virtual color gamut comprises at least three virtual primaries having associated intensity values, the method further comprising:

identifying, for at least one image frame in the video data, a first negative intensity value, the first negative intensity value being the most negative intensity value out of the intensity values associated with the three virtual primaries of the first virtual color gamut;

subtracting the identified first negative intensity value from the intensity values of all three virtual primaries of the first virtual color gamut;

identifying, for the at least one image frame in the video data, a second negative intensity value, the second negative intensity value being the most negative intensity value out of the intensity values associated with the three virtual primaries of the second virtual color gamut; and subtracting the identified second negative intensity value from the intensity values of all three virtual primaries of the second virtual color gamut.

11. A display comprising:

a light source having a number of primary display colors;

a spatial light modulator illuminated by the light source; and a controller configured to:

receive video data having a format associated with an established color gamut defined by a predefined number of primary colors;

define a first virtual color gamut based on a combination of the number of primary display colors associated with said light source to approximate said established color gamut, the number of primary display colors associated with said light source exceeding the number of primary colors defining the established color gamut;

define a second virtual color gamut based on residual power of said light source considering said first virtual gamut;

determine luminance levels indicated by the video data;

generate intensity values associated with said first virtual color gamut based on said luminance levels indicated by said video data and generating intensity values associated with said second virtual color gamut based on said luminance levels indicated by said video data, wherein only said first virtual color gamut is used for luminance levels in a lower part of a luminance range associated with the light source and both said first virtual gamut and said second virtual color gamut is used for luminance levels in an upper part of the luminance range associated with the light source;

receive first and second blend matrices for calculating a weighted combination of said intensity values associated with said first virtual color gamut and said intensity values associated with said second virtual color gamut;

generate intensity values associated with the primary display colors of the light source by calculating a weighted combination of said intensity values associated with said first virtual color gamut and said intensity values associated with said second virtual color gamut, wherein said weighted combination is calculated by applying said first blend matrix to said intensity values associated with said first virtual gamut to obtain a first result, applying said second blend matrix to said intensity values associated with said second virtual gamut to obtain a second result, and adding the first and second results; and provide the intensity values associated with the primary display colors of the light source to the spatial light modulator.

12. The display according to claim 11, wherein the established color gamut is a Rec2020 gamut.

13. The display according to claim 11, wherein the number of primary display colors is twice as large as the number of colors corresponding to the intensity values of the video data.

14. The display according to claim 11, wherein the controller is configured to determine the luminance levels indicated by the video data by determining a separate luminance level for each color of the number of colors represented by the video data.

15. The display according to claim 11 wherein the controller is configured to compress the second virtual color gamut toward white.

16. The display according to claim 11 wherein the controller is configured to clip intensity values of at least one of the first virtual color gamut and the second virtual color gamut toward white.

17. The display according to claim 11 wherein the controller is configured to clip values of the first virtual color gamut and/or the second virtual color gamut that are outside an achievable gamut volume of the light source towards the achievable gamut volume.

18. The display according to claim 11 wherein the controller is configured to clip values of the first virtual color gamut and/or the second virtual color gamut that are outside an achievable gamut volume of the light source towards the achievable gamut volume without clipping the values of the first virtual color gamut and the second virtual color gamut that are within the achievable gamut volume.

19. The display according to claim 11 wherein the first virtual color gamut comprises at least three virtual primaries having associated intensity values, wherein the second virtual color gamut comprises at least three virtual primaries having associated intensity values, and wherein the controller is configured to:

identify, for at least one image frame in the video data, a first negative intensity value, the first negative intensity value being the most negative intensity value out of the intensity values associated with the three virtual primaries of the first virtual color gamut;

subtract the identified first negative intensity value from the intensity values of all three virtual primaries of the first virtual color gamut;

identify, for the at least one image frame in the video data, a second negative intensity value, the second negative intensity value being the most negative intensity value out of the intensity values associated with the three virtual primaries of the second virtual color gamut; and subtract the identified second negative intensity value from the intensity values of all three virtual primaries of the second virtual color gamut.

20. A non-transitory computer-readable storage medium having stored thereon computer-executable instructions that, when executed by a processor or processing system, cause the processor or processing system to perform the method of claim 1.

* * * * *